United States Patent
Shrewsbury et al.

(10) Patent No.: US 10,414,343 B2
(45) Date of Patent: Sep. 17, 2019

(54) SEATBACK POCKET

(71) Applicants: TS TECH CO., LTD., Saitama (JP);
HONDA MOTOR CO., LTD., Tokyo (JP)

(72) Inventors: Kurt Shrewsbury, Reynoldsburg, OH (US); Kristian Villanueva, Reynoldsburg, OH (US); Amit Danane, Reynoldsburg, OH (US); Ganesh Narayanan, Plain City, OH (US); Masakazu Okada, Dublin, OH (US); Ronald C. Cozzo, Delaware, OH (US)

(73) Assignees: Honda Motor Co., Ltd., Tokyo (JP); TS Tech Co., Ltd., Tochigi (JP)

( * ) Notice: Subject to any disclaimer, the term of this patent is extended or adjusted under 35 U.S.C. 154(b) by 18 days.

(21) Appl. No.: 15/868,337

(22) Filed: Jan. 11, 2018

(65) Prior Publication Data
US 2019/0210535 A1    Jul. 11, 2019

(51) Int. Cl.
*B60R 7/00* (2006.01)
*B60R 7/04* (2006.01)

(52) U.S. Cl.
CPC .............. *B60R 7/005* (2013.01); *B60R 7/043* (2013.01)

(58) Field of Classification Search
CPC ................................ B60R 7/005; B60R 7/043
USPC ....................... 296/37.15; 297/188.04–188.07
See application file for complete search history.

(56) References Cited

U.S. PATENT DOCUMENTS

| | | | |
|---|---|---|---|
| 1,527,056 A * | 2/1925 | Martin ..................... | B60R 7/043 224/566 |
| 5,292,174 A * | 3/1994 | Ohnuma ................. | B60R 7/043 297/188.06 |
| 6,131,993 A * | 10/2000 | Pesta ....................... | B60R 7/043 297/183.7 |
| 2011/0198896 A1* | 8/2011 | Brinster ................. | B60R 7/005 297/188.06 |
| 2014/0062147 A1* | 3/2014 | Bashir ..................... | B60R 7/005 297/188.01 |
| 2015/0321614 A1* | 11/2015 | Line ........................ | B60R 7/005 297/188.04 |
| 2017/0282759 A1* | 10/2017 | Line ......................... | B60N 2/20 |
| 2018/0134224 A1* | 5/2018 | Perrin ..................... | B60N 2/90 |
| 2018/0201196 A1* | 7/2018 | Hellman ................. | B60Q 3/225 |
| 2018/0244206 A1* | 8/2018 | Gawade .................. | B60R 7/005 |
| 2019/0039525 A1* | 2/2019 | Hu .......................... | B60R 7/043 |

FOREIGN PATENT DOCUMENTS

| | | |
|---|---|---|
| JP | 2001070090 A | 3/2001 |
| JP | 2001294071 A | 10/2001 |

* cited by examiner

*Primary Examiner* — Gregory A Blankenship
(74) *Attorney, Agent, or Firm* — Armstrong Teasdale LLP

(57) ABSTRACT

A seatback pocket structure includes a back board forming a back side of a seatback and a pocket forming board attached to the back board to define a seatback pocket between the back board and the pocket forming board. The back board includes a main part defining a major plane of the back board, and a cantilever tab having a base end connected to the main part and adapted for elastic bending deformation. The pocket forming board is connected to a free end part of the cantilever tab.

13 Claims, 5 Drawing Sheets

SEATBACK POCKET

TECHNICAL FIELD

The present invention relates to a seatback pocket structure, and particularly relates to a seatback pocket structure provided to a back board of a seat of a vehicle such as an automobile.

BACKGROUND ART

There is known a seatback pocket structure including a back board forming a back side of a seatback, and a pocket forming board made of plastic material and attached to the seatback via a flexible hinge (also called an integral hinge) formed by bending a lower part of the pocket forming board, such that a seatback pocket (may be simply referred to as a pocket hereinafter) for storing small articles is defined between the back board and the pocket forming board (see JP2001-70090A and JP2001-294071A, for example).

In such a seatback pocket structure, the flexible hinge allows the pocket forming board to be tilted rearward relative to the seatback. The rearward tilting of the pocket forming board increases the fore-and-aft width of the upper opening of the pocket, so that an article can be put into or taken out of the pocket easily.

In the following description, a state where the pocket forming board extends substantially parallel to the seatback will be referred to as a closed state of the pocket, while a state where the pocket forming board is tilted rearward relative to the seatback will be referred to as an opened state of the pocket.

The flexible hinge achieves a hinge action by deformation of the plastic material involving plastic deformation, and the flexible hinge undergoes plastic deformation every time the pocket is opened or closed, and therefore, a crack may be caused therein relatively easily during use and it is difficult to achieve sufficient durability. To form the pocket forming board having the flexible hinge, it is necessary to bend a flat board formed by injection molding, and this reduces the productivity. Since the flexible hinge is formed by the bent portion of the pocket forming board, the pocket forming board includes a residual stress at the bent portion, and this also makes it difficult to achieve sufficient durability.

SUMMARY OF THE INVENTION

In view of the above prior art problems, a primary object of the present invention is to provide a seatback pocket structure excellent in durability and productivity.

To achieve the above object, according to one aspect of the present invention, there is provided a seatback pocket structure, comprising: a back board (20) forming a back side of a seatback (18); and a pocket forming board (22) attached to the back board to define a seatback pocket (24) between the back board and the pocket forming board; wherein the back board includes a main part (26) defining a major plane of the back board, and a cantilever tab (34) having a base end (34D) connected to the main part and adapted for elastic bending deformation, the pocket forming board (22) being connected to a free end part of the cantilever tab (34).

According to this arrangement, opening and closing of the seatback pocket (24) is carried out by elastic deformation and restoration of the cantilever tab (34), and therefore, even if the opening and closing of the seatback pocket (24) is repeated, a damage is not caused easily to the cantilever tab (34), and thus, higher durability than that of the conventional pocket structure using a flexible hinge can be achieved. Further, because it is not necessary to provide the pocket forming board (22) with a flexible hinge, productivity is improved. Thus, a seatback pocket structure excellent in durability and productivity is provided.

In the above seatback pocket structure, preferably, the cantilever tab (34) extends vertically along the major plane of the back board, and the base end is located in a lower end of the cantilever tab, the free end part of the cantilever tab (34) being connected to a lower part of the pocket forming board (22).

According to this arrangement, the elastic deformation of the cantilever tab (34) when opening the seatback pocket (24) is performed as elastic deformation that causes the free end portion of the cantilever tab (34) to protrude from the main part (26) toward the seatback pocket (24), and therefore, when the seatback pocket (24) is opened, interference of a connecting portion between the pocket forming board (22) and the cantilever tab (34) with the main part (26) can be avoided.

In the above seatback pocket structure, preferably, a connecting portion of the cantilever tab (34) with the main part (26) has a same thickness as the main part.

According to this arrangement, the strength of the connecting portion between the cantilever tab (34) and the main part (26) is improved, and thus, higher durability is achieved.

In the above seatback pocket structure, preferably, the back board (20) is made of plastic material.

According to this arrangement, the back board (20) including the cantilever tab (34) can be formed with high productivity by injection molding.

In the above seatback pocket structure, preferably, the cantilever tab (34) is defined by a slit (36) formed in the back board (20).

According to this arrangement, the cantilever tab (34) can be formed when the back board (20) is formed by injection molding, without additional processing.

In the above seatback pocket structure, preferably, a terminal end of the slit (36) is formed as a rounded opening (38).

According to this arrangement, concentration of stress to a vicinity of the base end of the cantilever tab (34) corresponding to the terminal end of the slit (36) is avoided, and thus, the durability of the cantilever tab (34) is improved.

In the above seatback pocket structure, preferably, the pocket forming board (22) is provided with a projection (54), and the free end part of the cantilever tab (34) is formed with a hole (42) so that the pocket forming board (22) is connected to the cantilever tab (34) by fitting the projection (54) into the hole (42).

According to this arrangement, the connection of the pocket forming board (22) to the cantilever tab (34) can be achieved without use of special fastening parts.

In the above seatback pocket structure, preferably, the hole (42) is defined by a tubular boss (40) formed in the cantilever tab (34).

According to this arrangement, the length of fitting between the hole (42) and the projection (54) is increased, and therefore, the strength of connection between the cantilever tab (34) and the pocket forming board (22) is improved.

In the above seatback pocket structure, preferably, the main part (26) is integrally formed with a flange (26A) that projects rearwardly along a lower edge of the main part.

According to this arrangement, the flange (26A) constitutes the bottom of the seatback pocket (24), and improves the bending and torsional stiffness/strength of the back board (20).

In the above seatback pocket structure, preferably, the cantilever tab includes a pair of cantilever tabs (34, 34) provided in a lower part of the back board (20) in a laterally spaced apart relationship, each cantilever tab having a lower end (34D) defining the base end and an upper end (34C) defining a free end, wherein the seatback pocket structure further comprises a pair of flexible sheet members (58) each having one end connected to the back board (20) and another end connected to the pocket forming board (22) and extending along either side of the pocket forming board (22).

According to this arrangement, the pair of cantilever tabs allow a stable movement of the pocket forming board when opening and closing the seatback pocket. Also, the pair of flexible sheet members define the sides of the seatback pocket without hindering the movement of the pocket forming board.

DESCRIPTION OF THE PREFERRED EMBODIMENT(S)

In the following, an embodiment of the seatback pocket structure of the invention will be described with reference to FIGS. 1 to 5, where the seatback pocket structure is applied to an automobile front seat.

Figure 1:
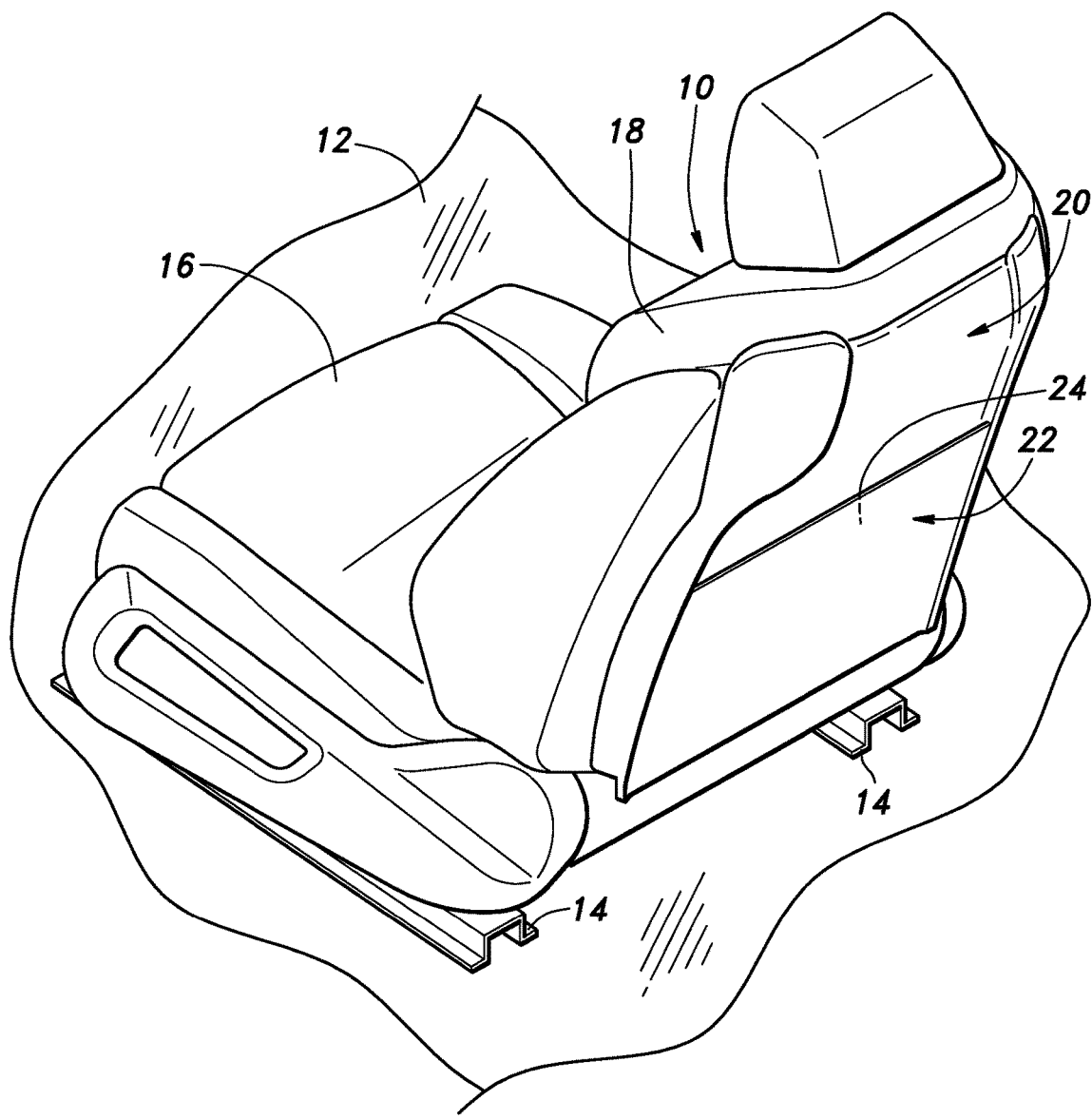
FIG. 1 is a rear perspective view of an automobile front seat to which a seatback pocket structure according to an embodiment of the present invention has been applied.

As shown in FIG. 1, a front seat 10 includes a seat cushion 16 and a seatback 18 mounted to the rear of the seat cushion 16. The seat cushion 16 is mounted on a pair of guide rails 14 extending in parallel with each other in a fore-and-aft direction on a floor panel 12, such that the position of the seat cushion 16 is adjustable along the guide rails 14.

The seatback 18 includes a back board 20 forming a back side of the seatback 18. A pocket forming board 22 is attached to a lower part of the back side of the back board 20. A seatback pocket 24 for storing small articles is defined between the back board 20 and the pocket forming board 22 (also see FIG. 4).

Next, with reference to FIGS. 2 to 5, detailed description will be made of the seatback pocket structure including the back board 20 and the pocket forming board 22.

The back board 20 is made of a plastic material by molding, and has a plate-shaped main part 26 defining a major plane. The back board 20 is secured to a seatback frame (not shown) of the seatback 18 by use of mounting portions 28, 30, 32 formed integrally in a lower part, an upper part, and a vertically middle part of the main part 26, respectively, on either side of the main part 26, whereby the back board 20 forms the back side of the seatback 18. The main part 26 integrally includes a flange 26A that extends along a lower edge and protrudes rearward. The flange 26A constitutes the bottom of the seatback pocket 24, and contributes to improving the bending and torsional stiffness/strength of the back board 20.

Figure 3:
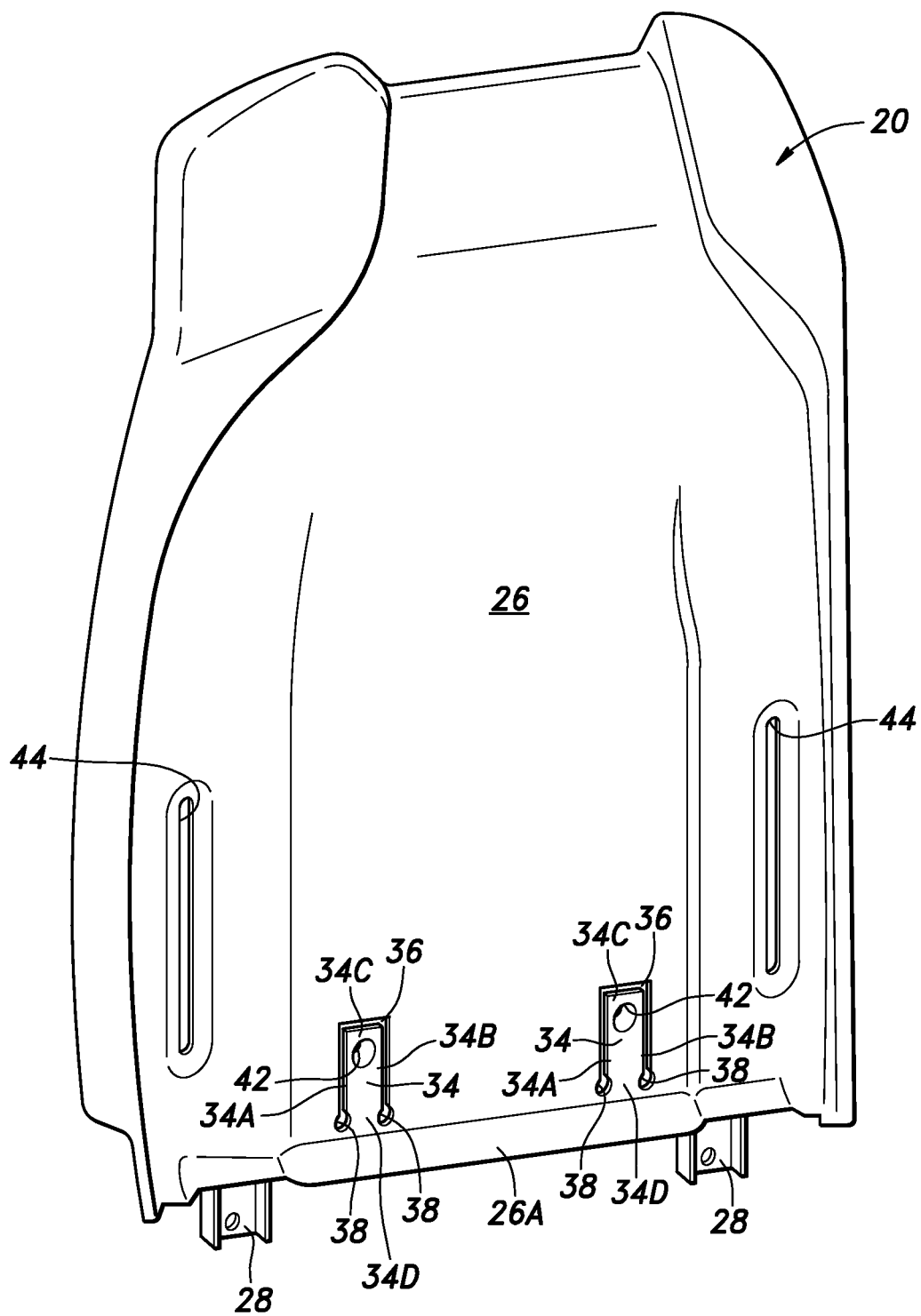
FIG. 3 is a rear perspective view of a back board used in the seatback pocket structure.
Figure 5:
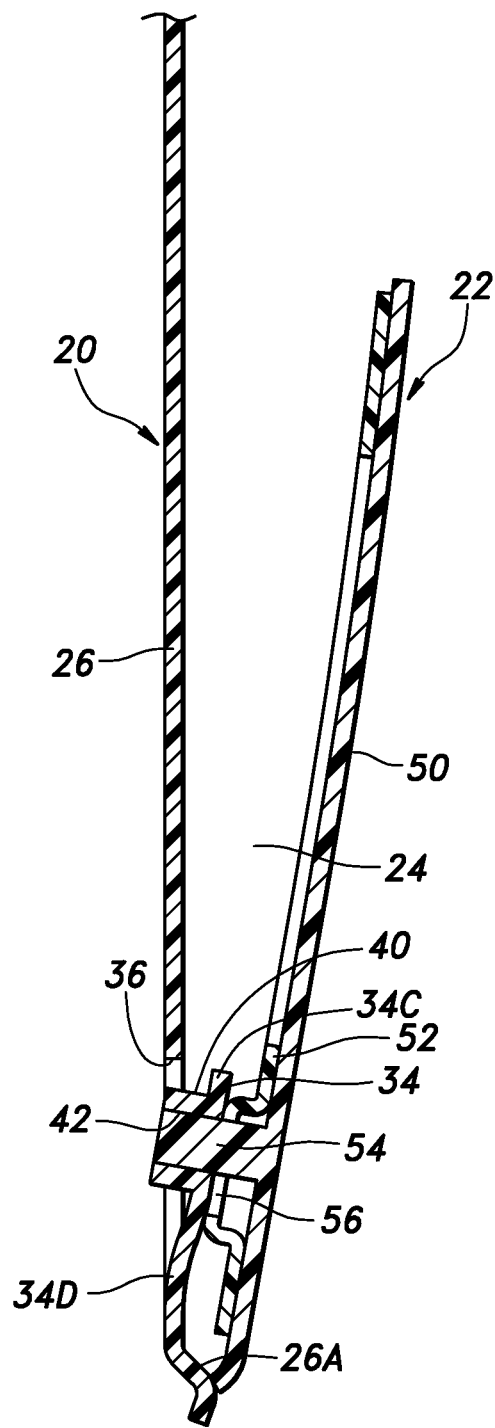
FIG. 5 is a fragmentary vertical sectional view similar to FIG. 4 and showing a state where the pocket is open.

The back board 20 has a pair of left and right cantilever tabs 34 in a lower part of the main part 26. As shown in FIG. 3, each cantilever tab 34 is defined by an inverted U-shaped slit 36 formed in the back board 20, such that the cantilever tab 34 assumes a vertically elongated rectangular shape having mutually parallel side edges 34A, 34B and an upper edge (upper end) 34C that are spaced from the main part 26. The cantilever tab 34 is connected to the main part 26 only at a base end 34D defined in a lower end thereof, and the upper edge 34C defines a free end. As shown in FIG. 5, each cantilever tab 34 is configured to be capable of undergoing elastic deformation in a direction in which the upper edge 34C is moved in the fore-and aft direction by bending deformation of a connecting portion (including the base end 34D) of the cantilever tab 34 with the main part 26 and the vicinity thereof within an elastic bending range. The elastic bending range (or bending modulus) necessary for the connecting portion of the cantilever tab 34 with the main part 26 and the vicinity thereof can be set by selecting the plastic material forming the back board 20 and the shape and dimensions of the cantilever tab 34.

The lower ends of the left and right side portions of each slit 36, namely, the terminal ends of each slit 36 are each formed as a circular opening 38 that is rounded to extend the slit width on a corresponding side of the base end 34D.

Figure 2:
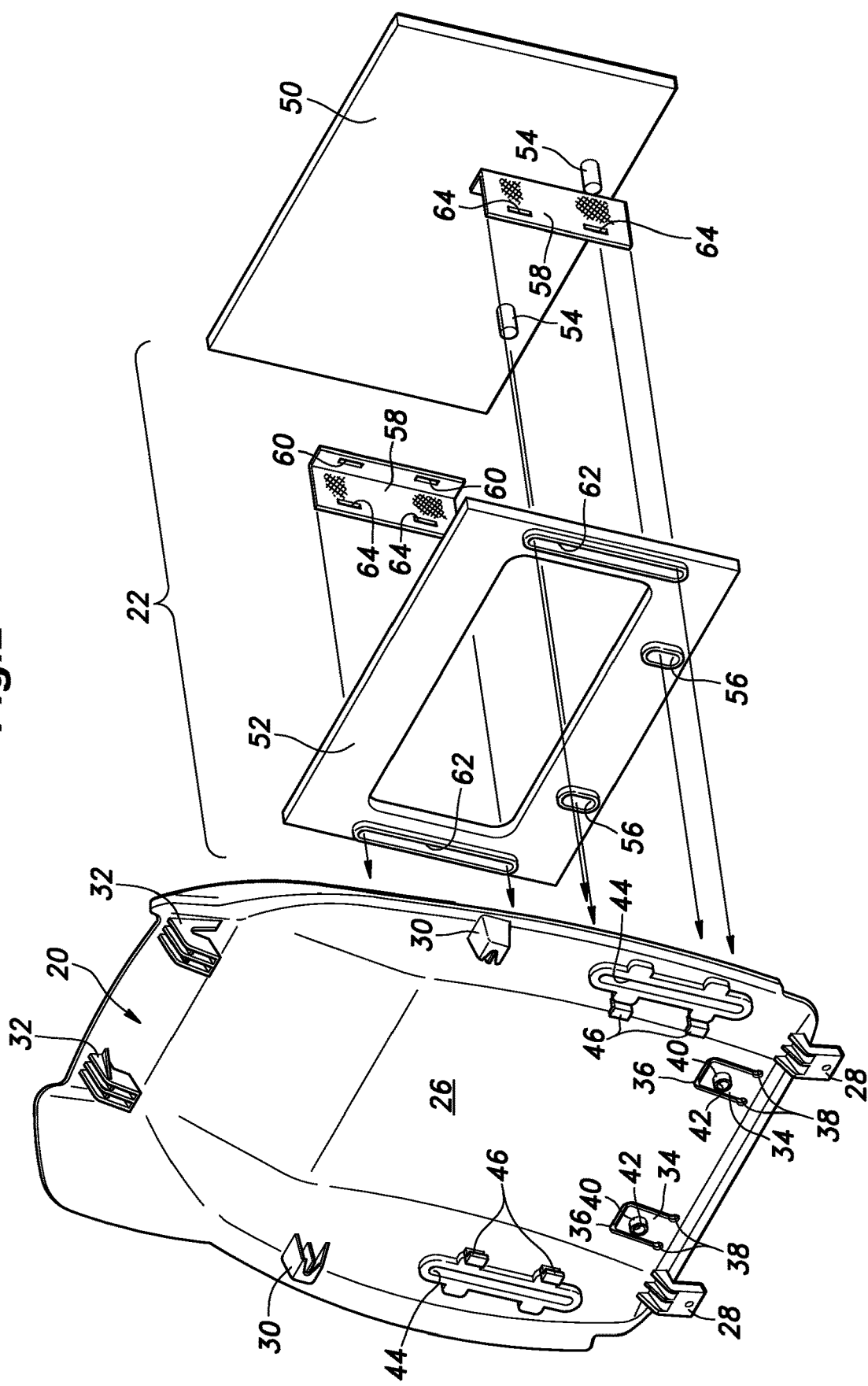
FIG. 2 is an exploded perspective view of the seatback pocket structure as viewed from the front.

As shown in FIG. 2, a free end part of each cantilever tab 34 is integrally formed with a tubular boss 40 that protrudes forward from the front surface of the free end part. Each tubular boss 40 defines a through hole 42 extending in the fore-and-aft direction and having a circular cross section.

The entire portion of each cantilever tab 34 excluding the tubular boss 40 has the same thickness as the main part 26, and in a free state (initial state) in which the cantilever tab 34 has not undergone elastic deformation, the cantilever tab 34 extends in parallel with the major plane of the main part 26 and the surface thereof is flush with the major plane of the main part 26. Accordingly, the connecting portion of the cantilever tab 34 with the main part 26 also has the same thickness as the main part 26.

Because each cantilever tab 34 is defined by the corresponding slit 36, cantilever tab 34 can be formed when the back board 20 is formed by injection molding, without additional processing.

Left and right side peripheral portions of the main part 26 are provided with respective openings 44 each formed as a straight slit extending from a lower part to a vertically middle part. A front surface of the main part 26 is integrally formed with hooks (projections) 46, such that two hooks 46 are located in a vertically spaced relationship in a vicinity of a laterally inner side edge of each opening 44 (see FIG. 2).

Figure 4:
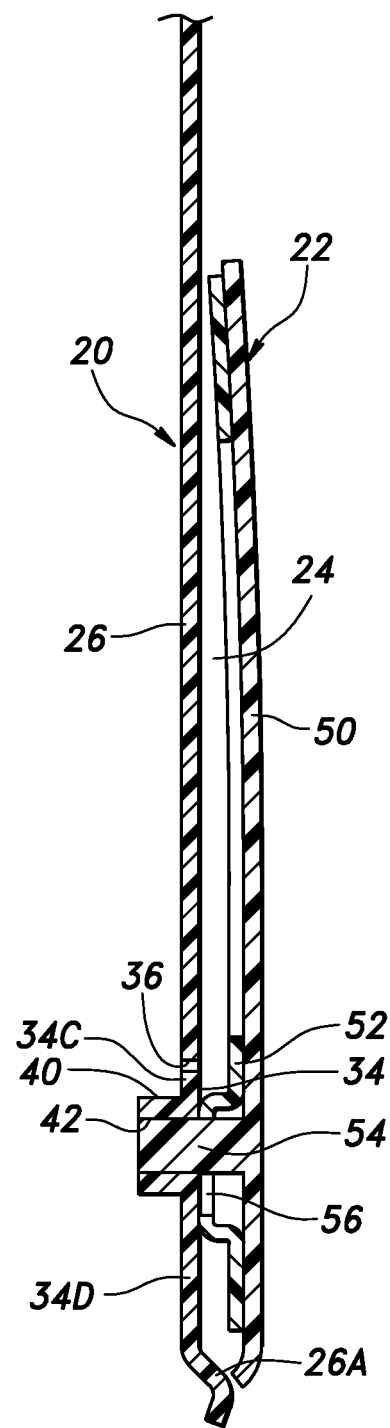
FIG. 4 is a fragmentary vertical sectional view of the seatback pocket structure in a state where the pocket is closed.

As shown in FIGS. 2, 4, and 5, the pocket forming board 22 is formed by bonding together a main body plate 50 and a reinforcing plate 52 each made of a plastic material by molding. The main body plate 50 has a rectangular plate shape, and is integrally formed with a pair of left and right cylindrical projections 54 in a lower part of a front surface thereof such that each projection 54 projects forward. The reinforcing plate 52 has a rectangular frame shape extending along an outer edge of the main body plate 50, and is joined to the front surface of the main body plate 50 by means of a double-sided adhesive tape, an adhesive agent, or the like.

The reinforcing plate 52 is formed with vertically elongated openings 56 through which the respective projections 54 are passed.

Each projection 54 passed through the corresponding elongated hole 56 is inserted into the corresponding through hole 42 from the back side of the back board 20 and is secured to the corresponding tubular boss 40, and hence to the corresponding cantilever tab 34, by means of an adhesive agent. Thereby, the pocket forming board 22 is attached to the back side (rear surface) of the back board 20 via the cantilever tabs 34 without need for special fastening parts, and therefore, the number of component parts can be reduced. In addition, the pocket forming board 22 can be connected to the cantilever tabs 34 without the connected portions (fastening portions) being exposed to the outer surface (rear surface) of the pocket forming board 22, and this is favorable in aesthetic or design point of view.

Because each through hole 42 is defined by the corresponding tubular boss 40, the through hole 42 is given a large axial dimension irrespective of the thickness of the pocket forming board 22. Accordingly, the length of fitting between the through hole 42 and the projection 54 is increased, and this improves the strength of securing of the pocket forming board 22 to the cantilever tab 34.

The illustrated seatback pocket structure further includes a pair of left and right sheet-shaped rubber members (flexible sheet members) 58 each having one end (front end) connected to the back board 20 and another end connected to the pocket forming board 22 and extending along either side of the pocket forming board 22. Each sheet-shaped rubber member 58 has two vertically spaced slits 60 in the rear end portion thereof and two vertically spaced slits 64 in the front end portion thereof. The reinforcing plate 52 is integrally formed with two pairs of hooks or protrusions (not shown) on the rear surface thereof, and each pair of hooks are inserted into the slits 60 of the corresponding sheet-shaped rubber member 58 to engage the rear end portion of the sheet-shaped rubber member 58 to the reinforcing plate 52. The sheet-shaped rubber members 58 extend forward through corresponding openings 62 formed in left and right peripheral portions of the reinforcing plate 52 and then through the corresponding openings 44 of the main part 26 of the back board 20 from the back side of the main part 26, and the slits 64 formed in the front end portion of each sheet-shaped rubber member 58 are engaged with the corresponding hooks 46 formed in the front surface of the main part 26, whereby the front end portion of the sheet-shaped rubber member 58 is securely connected to the main part 26.

Thereby, the seatback pocket 24 is formed between the back board 20 and the pocket forming board 22 as an upwardly opening space, with the bottom thereof being defined by the flange 26A and the sides thereof being defined by the pair of sheet-shaped rubber members 58.

As shown in FIG. 4, in the free state where the cantilever tabs 34 have not undergone elastic deformation, the pocket forming board 22 extends substantially in parallel with the major plane of the main part 26. This state is referred to as a closed state of the seatback pocket 24. If the upper portion of the pocket forming board 22 is pulled rearward by the user from the closed state of the seatback pocket 24, each cantilever tab 34 undergoes elastic deformation in a direction in which the upper edge 34C is moved rearward as shown in FIG. 5; more specifically, the connecting portion (mainly including the base end 34D) of each cantilever tab 34 with the main part 26 and the vicinity thereof undergo elastic deformation (bending deformation) and each sheet-shaped rubber member 58 expands while the pocket forming board 22 rotates rearward with the lower end thereof serving as a fulcrum so that the pocket forming board 22 tilts rearward relative to the main part 26. The tilting of the pocket forming board 22 increases the fore-and-aft width of the upper opening of the seatback pocket 24, namely, the seatback pocket 24 is opened to allow an article to be put into or taken out of the seatback pocket 24 easily.

Thus, in the illustrated embodiment, each cantilever tab 34 extends vertically along the main part 26 and is provided in a lower end thereof with the base end 34D that forms a connecting portion with a lower part of the main part 26. Therefore, the elastic deformation of each cantilever tab 34 when opening the seatback pocket 24 is performed as elastic deformation in a direction in which the upper edge 34C (free end portion) is moved rearward relative to the main part 26, namely, elastic deformation that causes the upper edge 34C to protrude from the main part 26 toward the seatback pocket 24, and therefore, interference of the connecting portion between the cantilever tab 34 and the pocket forming board 22 with the main part 26 can be avoided.

In the opened state of the seatback pocket 24, if the user releases the pocket forming board 22, each cantilever tab 34 returns, on its own elasticity, to the initial state where the cantilever tab 34 extends in parallel with the major plane of the main part 26. Along with such a movement of the cantilever tabs 34, each sheet-shaped rubber member 58 contracts and the pocket forming board 22 returns to the initial state where it extends substantially in parallel with the major plane of the main part 26, namely, the closed state of the seatback pocket 24.

As described above, the opening and closing of the seatback pocket 24 is carried out by elastic deformation and restoration of each cantilever tab 34, and therefore, even if the opening and closing of the seatback pocket 24 is repeated, a damage to the cantilever tab 34 due to fatigue is not caused easily, and thus, higher durability than that of the pocket structure using a flexible hinge can be achieved. In addition, the connecting portion of each cantilever tab 34 with the main part 26 has the same thickness as the main part 26 and there is no cut extending in the connecting portion. Therefore, the connecting portion has a high strength, contributing to achieving a pocket structure having higher durability than that of the pocket structure using a flexible hinge.

Further, because each cantilever tab 34 is formed without including a residual stress, reduction in durability due to the residual stress can be avoided.

Because the terminal ends of each slit 36 are each formed as the circular opening 38, a stress caused by the elastic deformation of the base end 34D of each cantilever tab 34 when opening and closing the seatback pocket 24 is spread over a wider area around the circular opening 38 compared to a case where the terminal ends of the slit 36 are each formed as an angular end. Thereby, concentration of stress to the vicinity of the base end 34D of each cantilever tab 34 can be avoided, and thus, the durability of each cantilever tab 34 is improved.

Further, because the pocket forming board 22 does not need to integrally include a portion for forming a flexible hinge, the pocket forming board 22 is not limited to one molded of a plastic material, but may be made of a light metal such as aluminum. Further, because a process for providing the pocket forming board 22 with a bent portion for forming a flexible hinge is not necessary, the productivity of the pocket forming board 22 is improved.

Although the present invention has been described in terms of a preferred embodiment thereof, it is obvious to a person skilled in the art that the present invention is not limited to the preferred embodiment and various alterations and modifications are possible without departing from the scope of the present invention.

For instance, the shape of the cantilever tab 34 is not limited to a rectangular shape, and the cantilever tab 34 may have an inverted U-shape outline or a semicircular outline, for example. The number of the cantilever tabs 34 is not limited to two, and only one or more than two cantilever tabs 34 may be provided. Also, the cantilever tab 34 may be elongated in the lateral direction. The sides of the seatback pocket 24 may be defined by side walls formed in the back board 20 or the like, instead of the sheet-shaped rubber members 58. Each terminal end of the slit 36 may be formed as any opening rounded for stress spreading, such as a U-shaped opening, other than the expanded circular opening 38.

The invention claimed is:

1. A seatback pocket structure, comprising:
a back board forming a back side of a seatback; and
a pocket forming board attached to the back board to define a seatback pocket between the back board and the pocket forming board;
wherein the back board includes a main part defining a major plane of the back board, and a cantilever tab having a base end connected to the main part and adapted for elastic bending deformation, the pocket forming board being connected to a free end part of the cantilever tab, and
wherein the cantilever tab is defined by a slit formed in the back board.

2. The seatback pocket structure according to claim 1, wherein the cantilever tab extends vertically along the major plane of the back board, and the base end is located in a lower end of the cantilever tab, the free end part of the cantilever tab being connected to a lower part of the pocket forming board.

3. The seatback pocket structure according to claim 1, wherein a connecting portion of the cantilever tab with the main part has a same thickness as the main part.

4. The seatback pocket structure according to claim 1, wherein the back board is made of plastic material.

5. The seatback pocket structure according to claim 1, wherein a terminal end of the slit is formed as a rounded opening.

6. The seatback pocket structure according to claim 1, wherein the pocket forming board is provided with a projection, and the free end part of the cantilever tab is formed with a hole so that the pocket forming board is connected to the cantilever tab by fitting the projection into the hole.

7. The seatback pocket structure according to claim 6, wherein the hole is defined by a tubular boss formed in the cantilever tab.

8. The seatback pocket structure according to claim 1, wherein the main part is integrally formed with a flange that projects rearwardly along a lower edge of the main part.

9. The seatback pocket structure according to claim 1, wherein the cantilever tab includes a pair of cantilever tabs provided in a lower part of the back board in a laterally spaced apart relationship, each cantilever tab having a lower end defining the base end and an upper end defining a free end, and
wherein the seatback pocket structure further comprises a pair of flexible sheet members each having one end connected to the back board and another end connected to the pocket forming board and extending along either side of the pocket forming board.

10. The seatback pocket structure according to claim 6, wherein the pocket forming board includes a main body plate and a reinforcing plate joined to a surface of the main body plate facing the back board,
the hole formed in the cantilever tab is a through hole,
the projection of the pocket forming board is formed in the main body plate,
the reinforcing plate is provided with a vertically elongated hole, and
the projection of the main body plate is fitted into the through hole of the cantilever tab in a state of penetrating the elongated hole of the reinforcing plate.

11. The seatback pocket structure according to claim 10, wherein the through hole is defined by a tubular boss formed in the cantilever tab.

12. The seatback pocket structure according to 9, wherein the pocket forming board includes a main body plate and a reinforcing plate joined to a surface of the main body plate facing the back board,
the reinforcing plate is provided with a pair of first openings extending along either side of the reinforcing plate,
the main part of the back board is provided with a pair of second openings extending along either side of the main part of the back board,
each flexible sheet member penetrates a corresponding one of the first openings of the reinforcing member and engages a corresponding one of the second openings of the main part of the back board.

13. A seatback pocket structure, comprising:
a back board forming a back side of a seatback; and
a pocket forming board attached to the back board to define a seatback pocket between the back board and the pocket forming board;
wherein the back board includes a main part defining a major plane of the back board, and a cantilever tab having a base end connected to the main part and adapted for elastic bending deformation, the pocket forming board being connected to a free end part of the cantilever tab,
wherein the pocket forming board includes a main body plate and a reinforcing plate joined to a surface of the main body plate facing the back board, and
the reinforcing plate extends along an outer edge of the main body plate to define a hole in a central part thereof, the hole of the reinforcing plate being disposed so as to be sandwiched between the main body plate and the back board.

\* \* \* \* \*